United States Patent
Hirakata et al.

(10) Patent No.: US 6,864,943 B2
(45) Date of Patent: Mar. 8, 2005

(54) DISPLAY DEVICE

(75) Inventors: Yoshiharu Hirakata, Atsugi (JP); Shunpei Yamazaki, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/819,991

(22) Filed: Mar. 29, 2001

(65) Prior Publication Data

US 2001/0017684 A1 Aug. 30, 2001

Related U.S. Application Data

(62) Division of application No. 09/227,192, filed on Jan. 8, 1999, now Pat. No. 6,219,127.

(30) Foreign Application Priority Data

Jan. 12, 1998 (JP) .......................................... 10-018095

(51) Int. Cl.[7] ................................................ G02F 1/13
(52) U.S. Cl. ..................................................... 349/153
(58) Field of Search ........................... 349/153, 58, 156

(56) References Cited

U.S. PATENT DOCUMENTS

| | | | |
|---|---|---|---|
| 4,874,461 A | | 10/1989 | Sato et al. |
| 5,016,987 A | * | 5/1991 | Smith, Jr. ................... 349/153 |
| 5,148,301 A | * | 9/1992 | Sawatsubashi et al. ..... 349/153 |
| 5,169,693 A | | 12/1992 | Fujimura |
| 5,379,139 A | | 1/1995 | Sato et al. |
| 5,406,399 A | * | 4/1995 | Koike ......................... 349/58 |
| 5,739,882 A | | 4/1998 | Shimizu et al. |
| 5,831,710 A | * | 11/1998 | Colgan et al. .............. 349/156 |
| 5,952,676 A | | 9/1999 | Sato et al. |
| 5,963,288 A | | 10/1999 | Sato et al. |
| 6,356,330 B1 | | 3/2002 | Ando et al. |
| 6,465,268 B2 | | 10/2002 | Hirakata et al. |
| 6,480,254 B1 | * | 11/2002 | Fujita ......................... 349/149 |

FOREIGN PATENT DOCUMENTS

| | | |
|---|---|---|
| DE | 41 40 284 A1 | 6/1993 |
| JP | 54-51857 | 4/1979 |
| JP | 02-302729 | 12/1990 |
| JP | 04-152324 | 5/1992 |
| JP | 05-005891 | 1/1993 |
| JP | 06-082810 | 3/1994 |
| JP | 06-186539 | 7/1994 |
| JP | 06-214240 | 8/1994 |
| JP | 06-222317 | 8/1994 |
| JP | 07-209630 | 8/1995 |
| JP | 07-287239 | 10/1995 |
| JP | 11-095194 | 4/1999 |

OTHER PUBLICATIONS

Bahadur, Liquid Crystal Applications and Uses, pp. 411–419, vol. 1, Dec., 1990.

* cited by examiner

Primary Examiner—James A. Dudek
(74) Attorney, Agent, or Firm—Eric J. Robinson; Robinson Intellectual Property Law Office, P.C.

(57) ABSTRACT

A display device is provided, in which a member for sealing a liquid crystal is formed at sides of a pair of opposing substrates, so that a space other than an effective display region is made small and a substrate size is reduced. The pair of substrates is bonded to each other with a predetermined gap provided therebetween by an adhesive layer, and a liquid crystal injected in the gap is sealed in. The adhesive layer is formed closely to the sides of the substrates, so that a space where a sealing material is conventionally formed becomes unnecessary and the substrate size is made small. Moreover, a tape close to the adhesive layer is fixed to the sides of the substrates, so that an outer peripheral portion of the substrates is protected against impact, contamination, and electrostatic breakdown, and handling is simplified.

41 Claims, 6 Drawing Sheets

SECTIONAL VIEW OF PORTION b

PLAN VIEW OF TFT SUBSTRATE

FIG. 3B

PLAN VIEW OF OPPOSITE SUBSTRATE

FIG. 3C

SECTIONAL VIEW OF TFT SUBSTRATE AND OPPOSITE SUBSTRATE

SECTIONAL VIEW OF PORTION a    SECTIONAL VIEW OF PORTION a

DISPLAY DEVICE

BACKGROUND OF THE INVENTION

1. Field of the Invention

The present invention relates to a flat panel type display device, such as a liquid crystal display device or an organic EL display device, which is used for an information equipment, such as a computer or a portable terminal, or for an Audio Visual equipment such as a large screen television.

2. Description of the Related Art

Figure 7A:
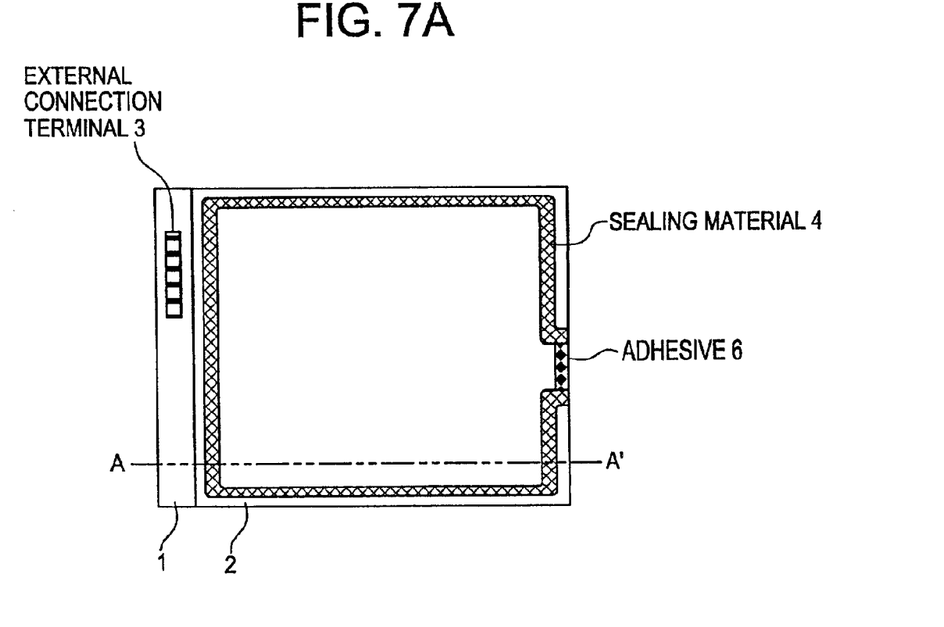
FIGS. 7A and 7B are a front view and a sectional view of a conventional liquid crystal display device.
Figure 7B:
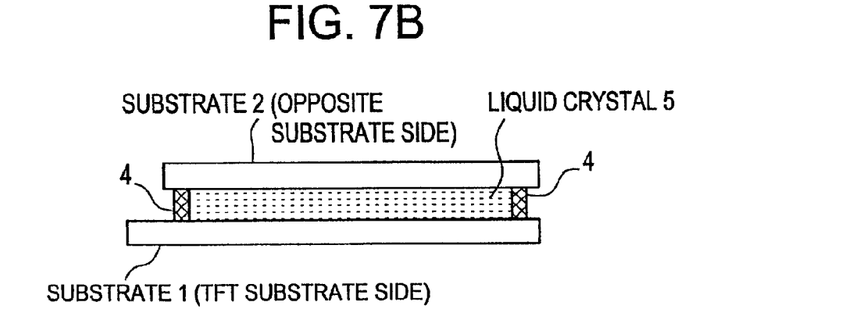

FIGS. 7A and 7B simply show the structure of a conventional liquid crystal display device. FIG. 7A is a front view and FIG. 7B is a sectional view taken along the line A–A' of FIG. 7A.

The liquid crystal display device includes a pair of substrates which are a TFT substrate 1 having a pixel matrix circuit and a driver circuit, and an opposite substrate 2 on which a color filter is formed. The substrates 1 and 2 are opposite to and bonded to each other, and a liquid crystal material 5 is sealed in a gap between the substrates by a sealing material. Reference numeral 3 denotes an external connection terminal for connecting a driver circuit formed on the TFT substrate 1 to an external power source circuit or the like.

The liquid crystal 5 is sealed in by a sealing material 4 formed on a peripheral portion of the substrate 1 or 2. The sealing material 4 is formed on the surface of the substrate 1 or 2 by a dispenser system, a screen printing method, or the like. A liquid crystal injection port is formed in a part of the sealing material 4, and is sealed with an adhesive 6 after the liquid crystal 5 is injected.

Since the sealing material 4 is formed on the surface of the substrate 1 or 2, the size of the substrate becomes large by the width of the sealing material 4 itself or a margin in a sealing material providing step. For example, a nozzle diameter of a dispenser is about 100 to 300 μm, and a sealing material with this width is linearly drawn on the surface of a substrate resulting that the width of the sealing material 4 becomes about 1 mm when the substrates 1 and 2 are bonded to each other.

As shown in FIGS. 7A and 7B, in the conventional device, the sealing material for sealing the liquid crystal material is formed on the surface of the substrate, so that the area of the substrate becomes larger than an effective display portion, which prevents miniaturization of the display device.

At present, a manufacturing technique of a polysilicon TFT has been established, and a liquid crystal display device in which a driver circuit and a pixel matrix circuit are integrated, is in plentiful supply. However, a substrate area becomes larger than an effective display region by the formation of the driver circuit. It is desirable that a space other than a display region is as small as possible in view of miniaturization of a device or getting multiple pieces. Thus, a method of disposing a sealing material on a driver circuit has been employed.

However, since glass filler for regulating a cell gap (an interval between substrates) is generally mixed in the sealing material, when the sealing material is disposed on the driver circuit, the filler gives damage and stress to the driver circuit. Moreover, since the driver circuit has a surface roughness larger than a pixel matrix circuit, it is very difficult to uniformly keep the cell gap on the driver circuit by the filler.

Moreover, an active type display device has a problem of heat generation since an insulating substrate, such as a glass substrate or quartz substrate, is used as a substrate. The thermal conductance coefficient of the sealing material is relatively small so that heat radiation is insufficient, and there is also a problem of detachment due to heat expansion and contraction.

SUMMARY OF THE INVENTION

An object of the present invention is to provide a display device in which the above described problems due to a sealing material is solved and a substrate size of a flat panel type display device is reduced.

In order to solve the above problems, the structure of a display device of the present invention is characterized in that the display device comprises a pair of substrates which are opposite to and are bonded to each other with a predetermined gap provided therebetween, an adhesive layer formed closely to the sides of the pair of substrates, and a tape or a frame member formed closely to the adhesive layer.

That is, in the display device of the present invention, a sealing material is not formed on the surface of the substrate, but the member for bonding the pair of substrates to each other and for sealing the gap therebetween is formed at the sides of the substrates.

DETAILED DESCRIPTION OF THE PREFERRED EMBODIMENTS

Figure 1A:
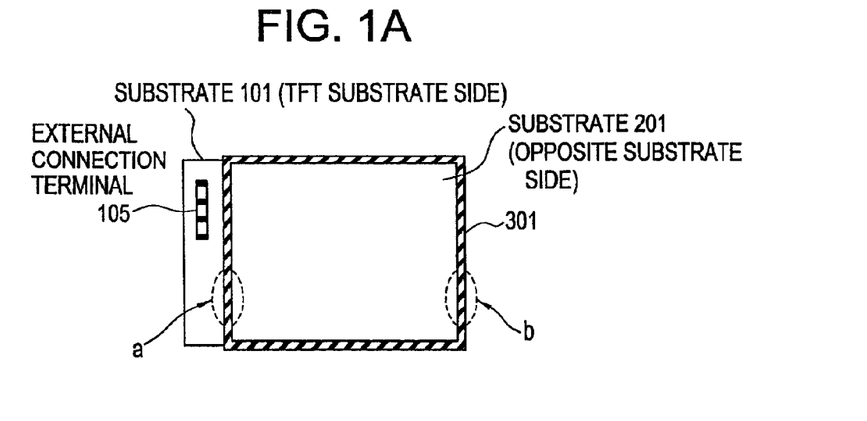
FIGS. 1A to 1D are explanatory views of a sealing member of embodiment 1.
Figure 1B:
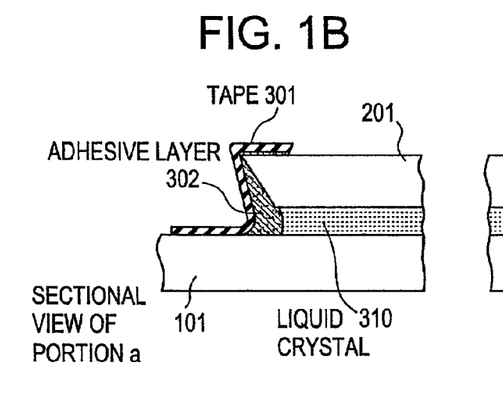
Figure 1C:
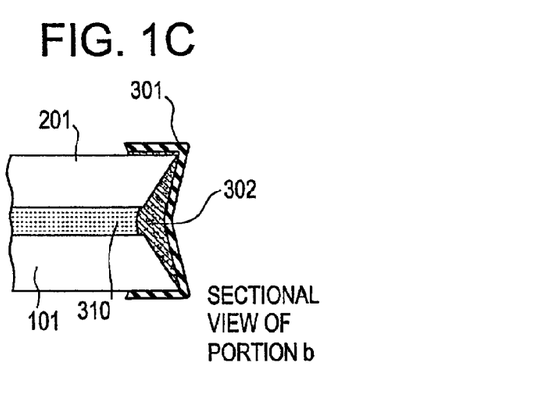

The best mode for carrying out the present invention will be described with reference to FIGS. 1A to 1D. In this embodiment, the present invention is applied to a liquid crystal display device. A pair of substrates 101 and 201 are bonded to each other, with a predetermined gap provided therebetween, by an adhesive layer 302 formed at the sides of the substrates, and a liquid crystal 310 injected in the gap is sealed in. FIGS. 1B and 1C are sectional views of portions "a" and "b" of FIG. 1A.

By forming the adhesive layer 302 at the sides of the substrates 101 and 201, a space where a sealing material is conventionally formed becomes unnecessary, so that the substrate size can be made small.

Moreover, by forming a tape 301 closely to the adhesive layer 302 at the sides of the substrates, the outer peripheral portions of the substrates can be protected against impact, so that handling becomes easy. Moreover, since the tape 301 separates the adhesive layer 302 from an outer environment, it is possible to obtain an effect of preventing contamination and deterioration of the adhesive layer 302, so that the reliability of the display device is improved.

Figure 1D:
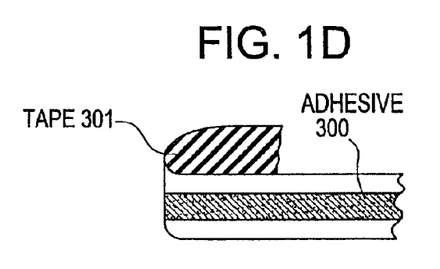

For the purpose of bonding and fixing the tape 301 to the sides (end surfaces) of the substrates 101 and 201 through the adhesive layer 302, as shown in FIG. 1D, an adhesive 300 is first disposed on the tape linearly. Then, as shown in FIGS. 1B and 1C, the tape 301 is wound on the sides of the pair of substrates 101 and 201 and the adhesive 300 is hardened.

In the following, the preferred embodiments of the present invention will be described in detail with reference to FIGS. 1 to 6.

Embodiment 1

Figure 3A:
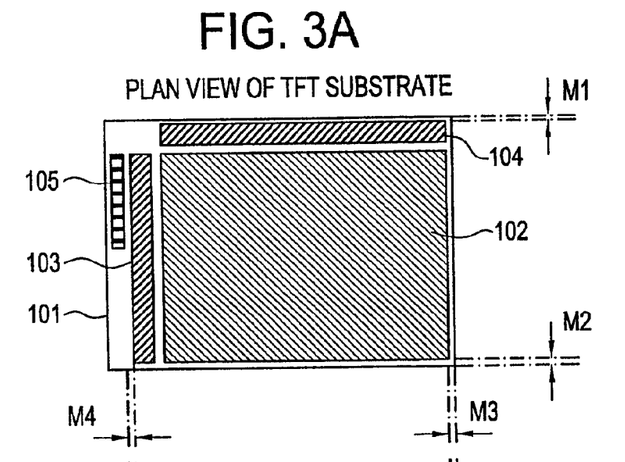
FIGS. 3A to 3C are plan views and a sectional view showing an opposite substrate and a TFT substrate of the embodiment 1.
Figure 3B:
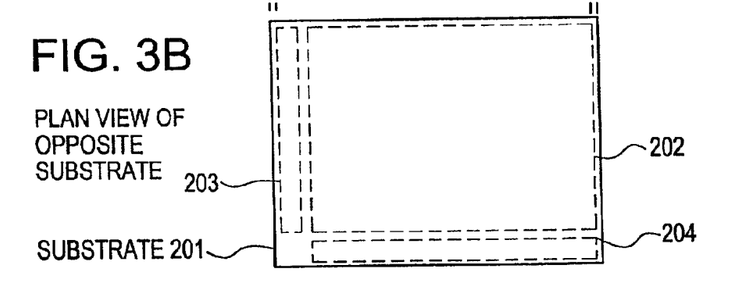
Figure 3C:
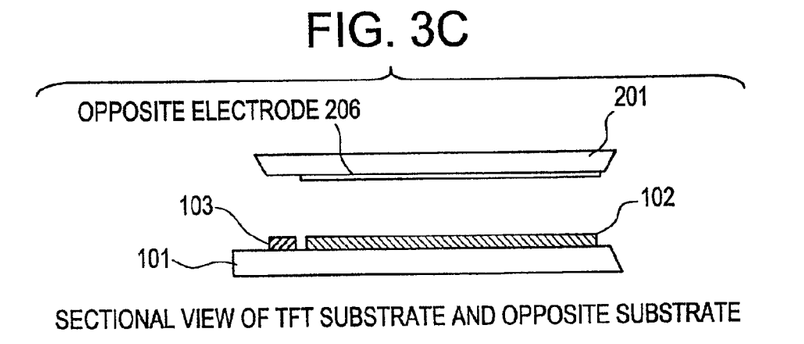

This embodiment shows an example in which the present invention is applied to an active type liquid crystal display device in which a driver circuit is integrated. FIG. 3A is a front view of a TFT substrate, FIG. 3B is a front view of an opposite substrate, and FIG. 3C is a schematic sectional view of the TFT substrate and the opposite substrate.

The TFT substrate is manufactured by using a well-known manufacturing technique of a polysilicon TFT. As shown in FIG. 3A, on a substrate 101, there are provided a pixel matrix circuit 102 including a pixel electrode formed for each pixel and a TFT (active element) connected to the pixel electrode, a gate driver circuit 103 and a source driver circuit 104 for driving the TFT of the pixel matrix circuit 102, and an external connection terminal 105. An FPC is connected to the external connection terminal 105. It is appropriate that a glass substrate, quartz substrate, or the like, which is transparent to visible light, is used as the substrate 101. In the case where a reflection type liquid crystal display device is manufactured, the substrate 101 at the TFT substrate side is not limited to a transparent substrate, but a silicon substrate or the like may be used.

Besides, the structure of the TFT substrate is not limited to that shown in FIG. 3A. For example, it is possible to enumerate a redundant structure in which two driver circuits are provided at both sides of a pixel matrix circuit, and a structure in which other circuits, such as a pre-charge circuit, are integrated in addition to a driver circuit. The structure of the TFT substrate does not limit the structure of the present invention.

A plurality of TFT substrates are formed on one substrate, and after completion, the substrate is divided into a predetermined shape. As shown in FIG. 3C, in this embodiment, shaping is made so that the side (end surface) of the divided substrate 101 becomes taper-shaped. Incidentally, although the end surface on the side where the external connection terminal 105 is formed is flat, the end surface on the side where the external connection terminal 105 is formed may also be shaped into a taper.

On the other hand, for the manufacture of the opposite substrate, a substrate of glass, quartz, or the like, which is transparent to visible light, is prepared. When the substrate is for color display, a color filter is formed on a region 202 opposite to the pixel matrix circuit 102 on the substrate. An opposite electrode 206 made of a transparent conductive film of ITO or the like is formed to cover at least the region 202 of the substrate 201. Next, similar to the TFT substrate, the substrate is divided into a predetermined shape. Four sides (end surfaces) of the divided substrate 201 are tapered.

In the dividing step of the substrates 101 and 201, if a dicer is used, dividing and working of a side (end surface) can be carried out in the same step. Alternatively, it is also possible to polish the end surface after dividing is carried out by breaking subsequently to scribing. In FIG. 3B, reference numerals 203 and 204 denote regions opposite to the gate driver circuit 103 and the source driver circuit 104, respectively.

After the completion of the dividing step, a not-shown orientation film for orienting a liquid crystal is formed on the outermost surface of the TFT substrate and the opposite substrate, and a rubbing process is carried out.

Next, spherical spacers for holding a cell gap are dispersed on one of the TFT substrate and the opposite substrate. Then, as shown in FIG. 3C, the TFT substrate and the opposite substrate are made opposite to each other, and the pair of substrates 101 and 201 are bonded to each other while maintaining the gap regulated by the spacers. In this embodiment, a sealing member for bonding the substrates and for sealing a liquid crystal is formed at the sides of the substrates 101 and 201. A tape provided with an adhesive is used as this sealing member. A manufacturing method of the sealing member for a liquid crystal will be described below with reference to FIGS. 1A to 1D.

As shown in FIG. 1D, an adhesive 300 made of UV setting resin is linearly disposed on a long tape 301 by a dispenser. Then, as shown in FIG. 1A, the tape 301 with the adhesive 300 inside is wound around the sides of the substrates 101 and 201 so as to close the gap between the bonded substrates 101 and 201. At this time, a liquid crystal injection port is left.

The substrate 201 has such a shape that in the state where the substrate 201 is bonded to the TFT substrate, the substrate 201 covers the circuits 102 to 104 of the TFT substrate and does not cover the external connection terminal 105, so that the circuits 102 to 104 on the TFT substrate are protected by the substrate 201. The surface of the substrate 101 where the external connection terminal 105 is formed, protrudes from the side of the substrate 201, so that connection to an FPC can be easily made.

For the purpose of miniaturizing a liquid crystal display device, it is preferable that the side (end surface) of the substrate 101 does not protrude from the side (end surface) of the substrate 201. Besides, it is designed to prevent such a state that the substrate 101 protrudes so that the pixel matrix circuit 102 and the driver circuit are exposed. Here, the side of the substrate 201 is made almost coincident with the side of the substrate 101.

FIGS. 1B and 1C are sectional views schematically showing portions "a" and "b" in FIG. 1A, respectively. That is, the portion "a" shows a portion where the TFT substrate protrudes from the opposite substrate, and the portion "b" shows a portion where the sides (end surfaces) of the substrate 101 and the opposite substrate 201 are almost coincident with each other.

As the tape 301 used for the sealing member, it is possible to use a metallic material having high heat conductivity, such as an aluminum or copper tape, or a material having humidity resistance, such as a paper tape coated with resin or aluminum. For the adhesive 300, in addition to the UV setting resin, it is possible to use a thermosetting resin material that is set at a relatively low temperature such as room temperature.

The linearly disposed adhesive 300 has suitable viscosity, and as shown in FIGS. 1B and 1C, when the tape 301 is wound around the sides (end surfaces) of the substrates 101 and 201, the adhesive 300 is pressed and spread almost all over the surface of the tape 301, so that the adhesion of the tape 301 is ensured. Then the tape is irradiated with UV light so that the adhesive 300 is hardened. The gap between the substrates 101 and 201 and the sides of portions where the two substrates are opposite to each other are covered with the sealing member made of the tape 301 through the adhesive layer 302, and the substrates 101 and 201 are bonded to each other with a predetermined gap provided therebetween.

Moreover, in this embodiment, for the purpose of enhancing the sealing effect and protecting the edge of the substrate, the tape 301 is, like a frame, made to cover not only the sides of the substrates 101 and 201 but also the peripheries of the surfaces of the substrates 101 and 201 which are exposed in the state where the substrates are bonded to each other. At the portion "a" where the substrate 101 protrudes from the substrate 201, the tape is formed so as to cover the protruding surface of the substrate 101 and the outer surface of the substrate 201. At the portion "b" where the substrates 101 and 201 are opposite to each other, the outer surfaces of the substrates 101 and 201 are also covered by the tape. However, it is important that the portion of the tape covering the outer surfaces of the substrates 101 and 201 does not overlap with an effective display region. Besides, it is preferable to fix the tape so that the driver circuits 103 and 104 are covered, and when this structure is adopted, it is possible to prevent a photo leak current from flowing in the driver circuits.

After the adhesive layer 302 is hardened, a liquid crystal 310 is injected from the liquid crystal injection port. Then the liquid crystal injection port is also covered by the tape 301 provided with the adhesive 300 as shown in FIG. 1D. At this time, the end of the previously wound tape is made to overlap with the end of the tape for closing the injection port. Through the above steps, as shown in FIGS. 1A and 1B, the structure where the liquid crystal 310 is sealed in the gap between the substrates 101 and 201 by the sealing member is obtained. Incidentally, in FIGS. 1A and 1B, circuits and opposite electrodes formed on the substrates 101 and 201 are omitted.

In this embodiment, it is unnecessary to dispose a sealing material on the surface of a substrate, so that a substrate size can be reduced, and contrary to the conventional sealing material, damage or stress is not applied to a driver circuit. Moreover, as shown in FIG. 3A, it is possible to reduce margins M1 to M4 from the edge of the substrate 101 (201) to the circuits 102 to 104 (regions 202 to 205 opposite to the circuits).

In this embodiment, as shown in FIGS. 1B and 1C, the end faces of the substrates 101 and 102 are tapered, so that the end faces of the bonded substrates 101 and 201 together form a wedge-shaped space, and the adhesive 300 collects in this space. Thus, it becomes difficult for the adhesive 300 to intrude into the space between the substrates 101 and 201. Moreover, since a contact area between the adhesive 300 and the substrates 101 and 201 is increased, the adhesion strength can be raised.

Since the adhesive layer 302 is designed not to intrude into the space between the substrates 101 and 201, as the foregoing margins M1 to M4, it is sufficient if only margins in the dividing step are taken into consideration. In the case where a scriber dicer is used in the dividing step, the values of the margins M1 to M4 can be lowered down to about 0.5 mm, and in the case where a dicer is used, the values can be lowered down to the range of 0.5 mm to 0.1 mm.

For the purpose of making the margins M1 to M4 small, it is better as a portion of the adhesive 300 intruding into the space between the substrates 101 and 201 gets smaller. Thus, the adhesive 300 with a rather low viscosity is not preferable, and it is important to make the adhesive have a suitable viscosity.

As methods of decreasing the intrusion of the adhesive 300, it is possible to enumerate a method in which as shown in FIG. 1D, the tape 301 is wound while the adhesive 300 is disposed thereon by a dispenser, and at the same time, the adhesive 300 is sequentially hardened by irradiation of UV light toward the wound portion, and a method in which the adhesive 300 disposed on the tape 301 is irradiated with UV light so that the adhesive is hardened a little.

Figure 2:
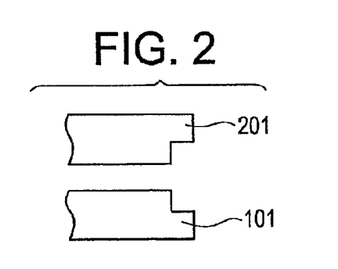
FIG. 2 is an explanatory view showing the shape of sides of substrates of the embodiment 1.

Moreover, in order to obtain the above effects, other than the structure in which the end surfaces of the substrates 101 and 201 are tapered, the end surfaces may be shaped like a step as shown in FIG. 2. Besides, in this embodiment, although the substrate 101 at the TFT substrate side is also tapered, when only the end surfaces of the opposite substrate 201 is shaped like a taper or a step, similar effects can be obtained. Incidentally, if the viscosity of the adhesive 300 is so high that the adhesive does not intrude into the space between the substrates, it is also admissible that the end surfaces of the substrates remain flat as in the conventional substrate.

Conventionally, since the sealing material is provided on the surface of the substrate, the outer peripheral portion of the substrate is in such a state that the portion beetles, like a hood, from the sealing material, so that the outer peripheral portion of the substrate is very brittle against a mechanical impact. Thus, in order to protect the substrate against the impact, in addition to an encasement in a final product form, the pair of substrates with the sealed liquid crystal is mounted in an outer frame (made of aluminum or plastics) and is made a module.

On the other hand, in this embodiment, the outer peripheral portions (including the gap, end surfaces, and outer surfaces) of the substrates 101 and 201 are protected by the sealing member. Thus, the conventional outer frame for a module becomes unnecessary, so that the display device can be made miniaturized and lightweight.

In the sealing member of this embodiment, since the gap between the substrates is covered with the adhesive layer 302, the liquid crystal is substantially sealed with the adhesive layer 302, and simultaneously, the substrates 101 and 201 are bonded to each other. However, in case only the adhesive layer made of a resin material is used, protection against impact or contamination is not sufficient. Then, by bonding and fixing the tape 301 to the gap between the substrates 101 and 201 and the sides (end surfaces) thereof through the adhesive layer 302, the strength of the outer peripheral portion of the substrate can be increased, and it is possible to prevent impurities from intruding into the liquid crystal material. Thus, handling of the substrate becomes easy, and it also becomes possible to handle the substrate by hand.

Further, by bonding and fixing the tape 301, an effect of preventing electrostatic breakdown of the TFT substrate can be obtained. In general, for the purpose of preventing the electrostatic breakdown in manufacture of a TFT, a wiring line for an internal short is formed so that the potential of the TFT substrate is made uniform. Then, in order to prevent the electrostatic breakdown in a product state, after the step of liquid crystal injection, the end of the wiring line for an internal short is polished obliquely so as not to be in contact with an end protruding outside of the conventional sealing material. However, the end of the wiring line is not completely protected.

On the contrary, in this embodiment, the side (end surface) of the substrate 101 is covered with the tape 301, so that contact with a wiring line for an internal short is prevented, and also in view of electrostatic breakdown, handling becomes easy and operation efficiency is improved.

In the case where the tape 301 is not provided but the adhesive is applied and hardened to form only the adhesive layer 302, if bubbles are mixed in the adhesive, the adhesive is hardened while the bubbles remain, so that the reliability of the adhesive layer 302 is lowered. On the contrary, when the tape 301 is also fixed to the side (end surface) of the substrate, the adhesive 300 before hardening can be pressed through the tape 301 when the tape 301 is wound on the side (end surface) of the substrate, so that the bubbles in the adhesive 300 can be driven out.

Moreover, in the driver integration type liquid crystal display device as in this embodiment, there is a problem of heat generation in the driver circuit. However, in the liquid crystal display TFT, the insulating substrate of glass, quartz, or the like is used, and the heat conductivity of the sealing material is also low, so that it is difficult to effectively diffuse heat. Thus, a tape of a metal material such as aluminum, which has heat conductivity higher than the insulating substrate and the adhesive layer 302, or a tape coated with such a metal material is used as the tape 301, so that a heat diffusing function can be provided.

Especially in this embodiment, since the distance (substrate margins M1 to M4) from the tape 301 to the circuits 103 and 104 is small, heat from the circuits 103 and 104 can be effectively diffused to the tape 301. Moreover, since the tape 301 is in close contact with the adhesive layer 302, the tape has an effect of preventing the detachment of the adhesive layer 302 due to heat expansion and contraction.

Incidentally, in FIG. 1A, although the tape 301 is not bonded to the end of the substrate 101 where the substrate protrudes from the opposite substrate 201, if the tape 301 is also fixed to the end of this portion and the edge of both surfaces through the adhesive layer 302, the protection of the edge of the substrate 101 becomes more certain.

Embodiment 2

This embodiment is a modified example of the embodiment 1, and a frame member is used instead of the tape 302. This embodiment will be described with reference to FIGS. 4A to 4D. Incidentally, in FIGS. 4A to 4D, the same reference numerals as those of FIGS. 1 to 3 denote the same members.

Figure 4A:
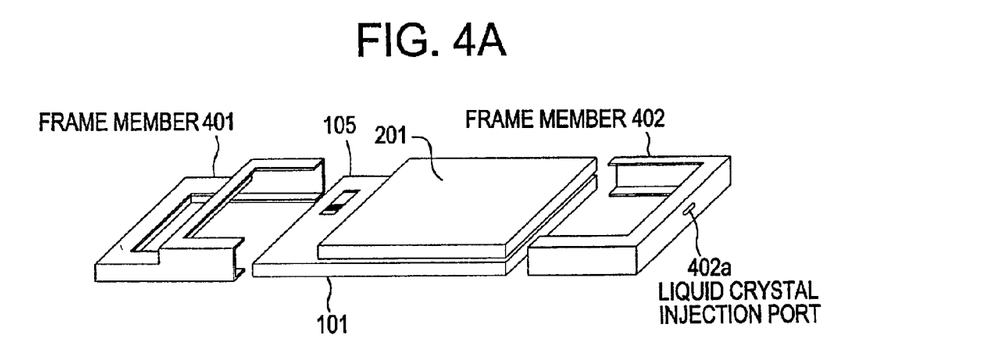
FIGS. 4A to 4D are explanatory views of a sealing member of embodiment 2.

First, as described in the embodiment 1, after spacers are dispersed, a substrate 101 constituting a TFT substrate is made opposite to a substrate 201 constituting an opposite substrate. Then, an adhesive made of thermosetting resin is disposed inside of frame members 401 and 402 divided into two pieces as shown in FIG. 4A. A liquid crystal injection port 402a is provided in the frame member 402, and care must be taken not to clog the injection port 402a with the adhesive. FIGS. 4C and 4D are sectional views showing portions "a" and "b" of FIG. 4A, respectively. The end surfaces of the substrates 101 and 201 are tapered similarly to the embodiment 1.

It is appropriate that the frame members 401 and 402 are formed of a material similar to a conventional outer frame for making a module. For example, the frame members can be formed of a metallic material, such as aluminum, aluminum alloy, stainless, or copper, or a resin material such as plastic.

Figure 4B:
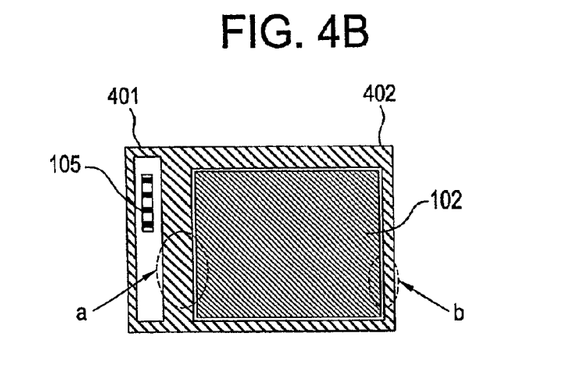
Figure 4C:
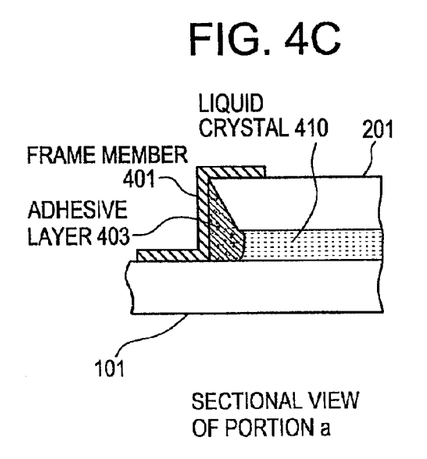
Figure 4D:
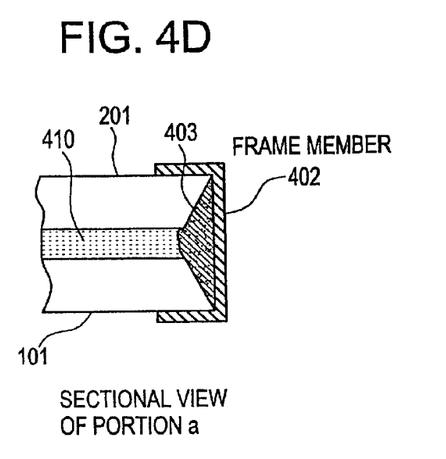

As shown in FIG. 4B, the frame member 401 and 402 are attached to the outer peripheral portions of the substrates 101 and 201, and the adhesive is hardened by heating. As shown in FIGS. 4C and 4D, the frame members 401 and 402 are fixed to the substrates 101 and 201 through the adhesive layer 403. Here, although the adhesive is applied to the sides of the frame members 401 and 402, the adhesive may be applied to the end surfaces of the substrates 101 and 201.

After a liquid crystal 410 is injected through the liquid crystal injection port 402a, a cap, which is fitted in the injection port 402a and is made of the same material as the frame members 401 and 402, is bonded and fixed to the injection port 402a by an adhesive. The liquid crystal 410 is sealed in the gap between the substrates 101 and 201 by the sealing member composed of the adhesive layer 403 and the frame members 401 and 402.

As shown in FIG. 4D, the section of the frame members 401 and 402 is C-shaped, and the members cover the peripheries of the outer surfaces of the substrates 101 and 201. On the other hand, like the portion "a" of the frame member 401, the sectional structure of the portion where the substrate 101 protrudes from the substrate 201 is such that as shown in FIG. 4C, the frame member covers the surface of the protruding substrate 101.

By this shape, the two frame members 401 and 402 can continuously cover the outer peripheries (end surfaces, gap, and outside surfaces) of the substrates 101 and 201 through the adhesive layer 403. The frame members 401 and 402 are set so as not to overlap with the pixel matrix circuit 102 which becomes an effective display region. Here, as shown in FIG. 4B, the frame members 401 and 402 are designed so as to cover the driver circuits 103 and 104. A window is bored in the frame member 401 so that the external connection terminal 105 is connected to an FPC.

The sealing member of this embodiment is composed of the frame members 401 and 402 fixed to the substrates 101 and 201 through the adhesive 403, and similar effects to the sealing member using the tape in the embodiment 1 can be obtained. It becomes possible to set the margins M1 to M4 (see FIG. 3A) of the substrate within the range of 0.1 to 0.5 mm as described in the embodiment 1. Particularly, since the frame members are used, protecting effects against mechanical impact, contamination, and static electricity are higher than those of the tape, and the adhesive layer 403 with little bubbles can be formed with reliability. Moreover, as set forth in the embodiment 1, when the frame member is made of a metallic material, such as aluminum, having heat conductivity higher than the adhesive layer 403, heat generated in the driver circuit can be effectively diffused.

The airtightness of the frame members 401 and 402 is sufficient if the liquid crystal does not leak, it is not necessary to form the adhesive layer 403 on the whole surface of the inside of the frame members 401 and 402, but the adhesive layer may be partially provided to a degree that the frame members can be fixed to the substrates 101 and 201.

In this embodiment, although the frame member constituting the sealing member is divided into two pieces, it may be divided into four pieces for every side, or even in the case where it is divided into two pieces, it may be divided into upper and lower portions. In the case where the liquid crystal display device is a reflection type, it is also possible to adopt such a structure that the frame members cover all the outside surface of the TFT substrate 101.

Embodiment 3

This embodiment shows an example in which the sealing members of the embodiments 1 and 2 are combined. First, as described in the embodiment 1, a tape is fixed to the outer peripheral portions of substrates through an adhesive, and then, as described in the embodiment 2, frame members are bonded and fixed by the adhesive.

In the case where the liquid crystal display device of the embodiments 2 or 3 is used as a light bulb of a reflection type display device, the frame members 401 and 402 of the sealing member can be used as frames for encasement.

In this case, the sealing member is formed as shown in FIG. 3A, and an FPC is connected to the external connection terminal 105. Then the member covering the exposed surface (except a display region) of the substrate 101 is fixed by an adhesive or the like, so that a light bulb is completed.

Although the description of the embodiments of the present invention has been made on a liquid crystal display device, if the present invention is applied to a display device, such as an organic EL display, having a structure in which a pair of substrates are bonded to each other, it is possible to easily make the display device miniaturized and lightweight. Moreover, handling is simplified, and operation efficiency is improved. Moreover, in the case where the present invention is applied to a driver circuit integration type active matrix display device, it is possible to effectively diffuse heat generation in a circuit on a substrate.

Embodiment 4

A conventional sealing material is disposed on the surface of a substrate, and filler is mixed in the sealing member, so that it is possible to regulate a cell gap. On the other hand, the sealing member of the embodiments 1 to 3 is disposed at the sides (end surfaces) of the substrates, so that it does not regulate a cell gap. Although spherical spacers are dispersed in addition to filler in order to regulate the cell gap, there is also a case that a substrate on which the spherical spacers are dispersed can not be kept in a sufficient horizontal state until the sealing member of the embodiment is bonded and fixed to the substrate.

Figure 5A:
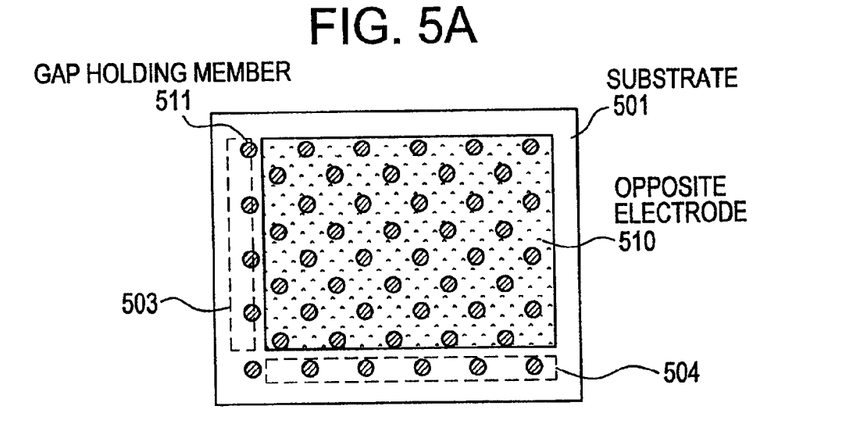
FIGS. 5A to 5C are explanatory views of the structure of a gap holding member of embodiment 3.
Figure 5B:
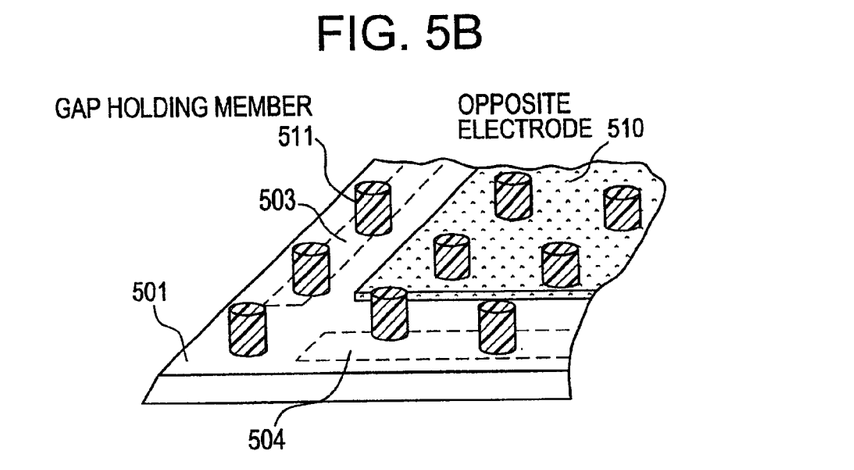
Figure 5C:
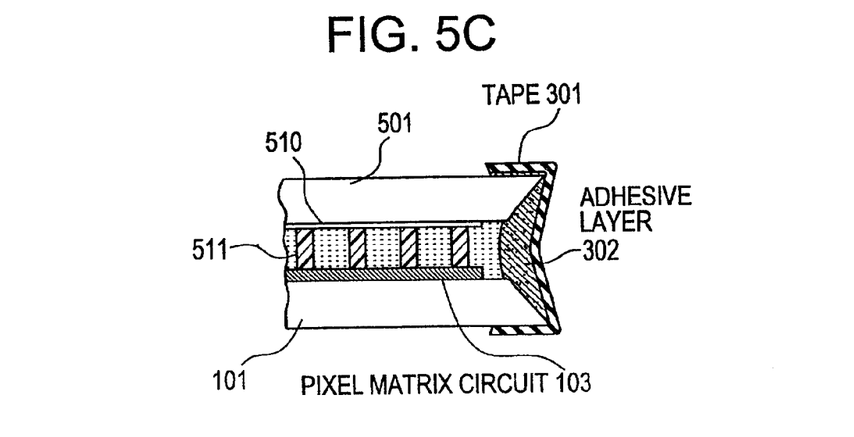

In order to solve such problems, in this embodiment, holding means of a cell gap suitable for a liquid crystal display device using the sealing member shown in the embodiments 1 to 3 will be shown. This embodiment will be described with reference to FIGS. 5A to 5C and FIGS. 6A to 6E. FIGS. 5A to 5C are structural views of a gap holding member 511 of this embodiment, FIG. 5A is a top view of the gap holding member 511, and FIG. 5B is a perspective view. FIG. 5C is a view schematically showing a sectional structure of a liquid crystal display device in accordance with this embodiment.

The gap holding member 511 is a cylindrical member made of polyimide which is one of photosensitive resin materials, and is formed on an opposite side substrate 501. Reference numerals 502, 503, and 504 denote regions corresponding to a matrix circuit, a gate driver circuit, and a source driver circuit of a TFT substrate, respectively. Reference numeral 510 denotes an opposite electrode formed on the region 502.

Figure 6A:
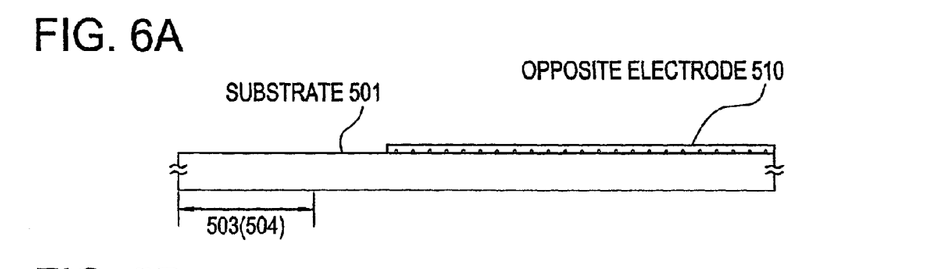
FIGS. 6A to 6E are sectional views for explaining manufacturing steps of the gap holding member of the embodiment 3.

Forming steps of the gap holding member 511 will be described below with reference to FIGS. 6A to 6E. First, a glass substrate or quartz substrate constituting the opposite substrate and having transparency is prepared. In this embodiment, the glass substrate 501 is used. A transparent conductive film is formed on the glass substrate 501 and is patterned so that the opposite electrode 510 is formed on the region 502 opposite to the matrix circuit 102 (FIG. 6A). In this embodiment, an ITO film with a thickness of 150 nm was formed as the transparent conductive film. If necessary, a color filter or a black matrix is formed before the opposite electrode 510 is formed.

Figure 6B:
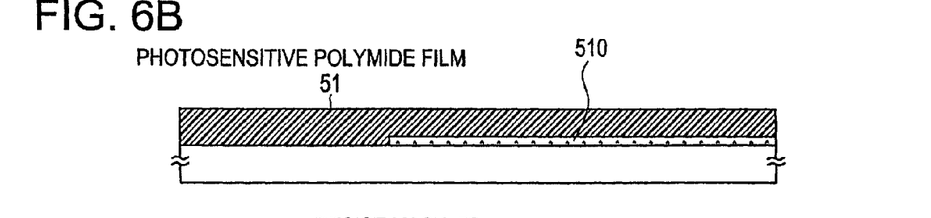

Next, as shown in FIG. 6B, a photosensitive polyimide film 51 with a thickness of 3.2 μm was formed by a spin coating method. Thereafter, for the purpose of flattening the surface of the photosensitive polyimide film 51 over the entire surface of the opposite substrate, the film was allowed to stand still for 30 minutes at room temperature (leveling). Next, the photosensitive polyimide film 51 was pre-baked for 3 minutes at 120° C.

Since a cell gap (an interval between substrates) is determined by the thickness of the photosensitive polyimide film 51, the thickness of the photosensitive polyimide film 51 is suitably determined according to the cell gap. For example, it is appropriate that the thickness is determined so that the cell gap becomes about 4 to 6 μm for a transmission type liquid crystal display device, the cell gap becomes about 2 to 3 μm for a reflection type liquid crystal display device, and the cell gap becomes 2 μm or less for a ferroelectric/ antiferroelectric liquid crystal display device. Here, the photosensitive polyimide film 51 with a thickness of 3.2 μm is formed.

As a method of controlling the film thickness, it is appropriate that a method of polishing the surface of the pre-baked photosensitive polyimide film 51 by a CMP treatment to a desired thickness is used.

Figure 6C:
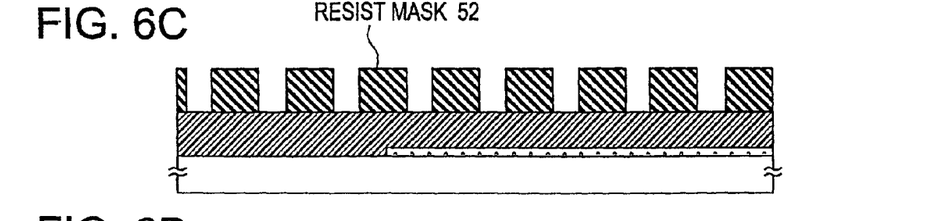

Next, the photosensitive polyimide film 51 is patterned. As shown in FIG. 6C, the photosensitive polyimide film 51 is covered with a photomask 52, and is irradiated with ultraviolet rays from the side of the mask 52. After a developing treatment, post baking at 280° C. for one hour is carried out. In this way, as shown in FIG. 6D and FIGS. 5A to 5C, the patterned cell gap holding members 511 are formed.

It is appropriate that the diameter of the cylinder of the gap holding member 511 is set to 1.5 to 2.5 μm, and the height is set to 2.0 to 5.0 μm. In this embodiment, the diameter of the cylinder is set to 3.0 μm and in order to make the cell gap 3.0 μm, the height thereof in the opposite region 502 opposite to the matrix circuit is set to 3.2 μm. The height of the gap holding member 511 in the opposite regions 503 and 504 opposite to the driver circuits becomes high by the thickness of the opposite electrode 510, color filter, and the like.

As shown in FIG. 5A, a plurality of gap holding members 511 are regularly disposed. As to their arrangement density, it is appropriate that the members are formed so that the density becomes about 40 to 160 pieces/mm$^2$ which is almost equal to that of conventional spherical spacers. In this embodiment, the density is set to 50 pieces/mm2. The arrangement of the gap holding members 511 is not limited to that shown in FIGS. 5A to 5C, but a user may suitably determine. For example, the gap holding members may be disposed at random, or may be disposed at regions other than a region opposite to a driver circuit.

As a material of the gap holding member 511, it is possible to use a photosensitive resin material or a resist material in addition to photosensitive polyimide. It is also appropriate that a thermosetting resin such as acryl, polyamide, or polyimide-amide is used.

The shape of the gap holding member 511 is not limited to a cylinder, but a cylindroid, streamline pole, or polygonal pole such as triangle pole or quadrangular pole may be used, and as long as the gap between the TFT substrate and the opposite substrate can be controlled, any shape may be adopted.

Figure 6D:
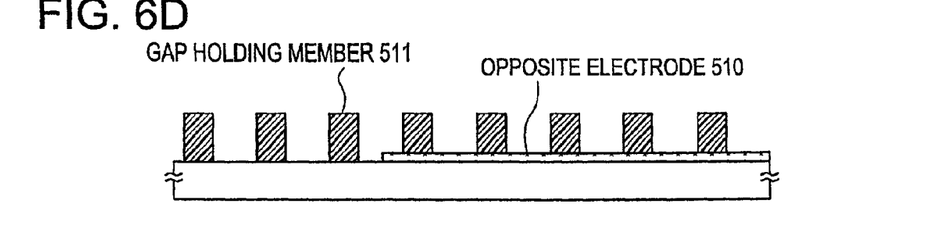

For example, after the state of FIG. 6D is obtained, an oxygen plasma process is carried out, so that the gap holding member 511 may be shaped into a trapezoid pole. By making the trapezoid pole, it is possible to absorb the impact received by the gap holding member 511 in a subsequent rubbing process of an orientation film.

Figure 6E:
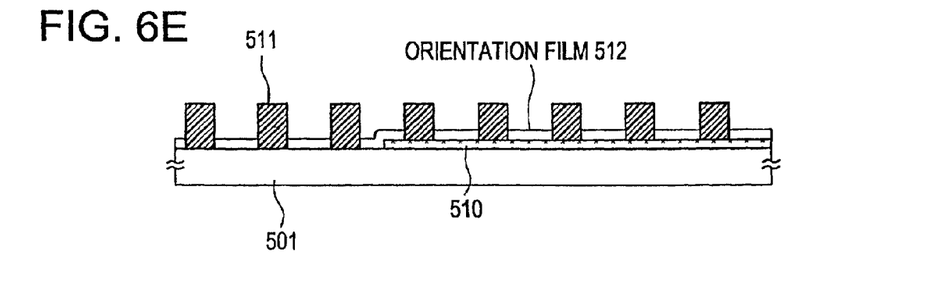

Here, although the gap holding members 511 are formed on the opposite substrate side, they may be formed on the TFT substrate side by using the foregoing steps. Next, as shown in FIG. 6E, an orientation film 512 is formed. A vertical oriented type polyimide film is used for the material of the orientation film 512, and the polyimide film is applied by a spin coating method. Thereafter, temporary baking at 80° C. for 5 minutes is performed, and heating (true baking) is performed by feeding a hot wind of 180° C. to harden polyimide, so that the orientation film 512 is formed.

In FIG. 6E, although the orientation film 512 does not cover the side and surface of the gap holding member 511, in this embodiment, since the polyimide coating film is formed by a spin coating method, there is also a case where this polyimide film covers the side and surface of the gap holding member 511 a little. However, the thickness of the polyimide film is as very thin as several tens to hundred nm while the height of the gap holding member 511 is several μm, and since there is also a case where a complete film is not formed at a vertical portion such as a side, so that merely the orientation film 512 formed on the surface of the substrate 501 is shown in FIG. 6E.

Next, the surface of the orientation film 512 is subjected to a rubbing process with a buff cloth (fiber such as rayon or nylon) having a pile length of 2 to 3 mm. At this time, for the purpose of preventing breakage of the gap holding member 511, rubbing conditions, such as the kind of buff cloth, pile implant density, and rotation number of a roller, are set.

Then, as described in the embodiments 1 to 3, the sealing member is formed on the TFT substrate and the opposite substrate, and the liquid crystal is sealed in. FIG. 5C shows a sectional structure of a liquid crystal display device using the sealing member of the embodiment 1.

Although the gap holding member 511 of this embodiment substitutes for a conventional spherical spacer, since it is a member fixed to the substrate, handling of the substrate at manufacturing steps of the sealing member also becomes easy in the embodiments 1 to 3. Moreover, the height of the holding member 511 can be set arbitrarily, so that the size of the cell gap can be determined arbitrarily, which is particularly useful for the case of a narrow cell gap of 2 μm or less in a ferroelectric liquid crystal display device or the like.

According to the foregoing embodiments 1 to 4, the display device is made miniaturized and lightweight, so that the display device is particularly suitable for a display device of a portable information equipment, a note-sized or mobile computer, an electronic organizer, a car navigation system, or the like. Moreover, the display device is also suitable for a light bulb of a projector type display device in which an encasement of a final product is different from that of the display device.

In the display device of the present invention, a sealing material is not disposed on the surface of a substrate, but an adhesive layer is formed on the side of the substrate and a pair of substrates are bonded to each other, so that the size of the substrate can be reduced. Further, a tape or a frame member is provided closely to the outside of the adhesive layer, so that handling becomes easy and an outer frame for making a module becomes unnecessary.

What is claimed is:

1. An EL display device comprising:
   a first substrate and a second substrate being bonded to each other with a gap provided therebetween;
   a pixel matrix circuit and a driver circuit for driving the pixel matrix circuit, each of the pixel matrix circuit and the driver circuit being formed over the first substrate;
   an adhesive layer being formed closely to the sides of portions of the first and second substrates opposed to each other; and
   a tape being formed closely to the adhesive layer,
   wherein at least one end face of the first substrate and the second substrate has a tapered portion covered by the adhesive layer and the tape.

2. The EL display device according to claim 1, wherein the tape covers a periphery of an exposed surface of the first and second substrates.

3. The EL display device according to claim 1, wherein the tape has heat conductivity higher than the adhesive layer.

4. The EL display device according to claim 1, wherein the EL display device is an active matrix type display device in which the first substrate thereover comprises the pixel matrix circuit and a driver circuit for driving at least an active element being formed in the pixel matrix circuit.

5. An EL display device comprising:
   a first substrate and a second substrate being bonded to each other, said first and second substrates being opposite to each other with a gap provided therebetween;
   a pixel matrix circuit and a driver circuit for driving the pixel matrix circuit, each of the pixel matrix circuit and the driver circuit being formed over the first substrate;
   an adhesive layer being formed closely to the sides of the first and second substrates; and
   a frame being formed closely to the adhesive layer,
   wherein at least one end face of the first substrate and the second substrate has a tapered portion covered by the adhesive layer and the frame.

6. The EL display device according to claim 5, wherein the frame covers a periphery of an exposed surface of the first and second substrates.

7. The EL display device according to claim 5, wherein the frame has heat conductivity higher than the adhesive layer.

8. The EL display device according to claim 5, wherein the EL display device is an active matrix type display device in which the first substrate thereover comprises the pixel matrix circuit and a driver circuit for driving at least an active element being formed in the pixel matrix circuit.

9. A liquid crystal display device comprising:
   a first substrate;
   a pixel matrix circuit formed over the first substrate;
   a second substrate opposed to said first substrate with a gap therebetween;
   an adhesive disposed on at least one side edge of the first substrate and one side edge of the second substrate to fill an opening therebetween; and
   a tape covering said adhesive wherein said tape extends beyond edges of the adhesive to cover portions of the first and second substrates,
   wherein the adhesive contacts with liquid crystal, and
   wherein at least one end face of the first substrate and the second substrate has a tapered portion covered by the adhesive layer and the tape.

10. The liquid crystal display device according to claim 9 further comprising a driver circuit formed over the first substrate for driving said pixel matrix circuit.

11. The liquid crystal display device according to claim 9 wherein said tape comprises a metallic material.

12. The liquid crystal display device according to claim 9 wherein said adhesive comprises a UV setting resin.

13. The liquid crystal display device according to claim 9 wherein said adhesive comprises a thermosetting resin.

14. An EL display device comprising:
   a first substrate;
   a pixel matrix circuit formed over the first substrate;
   a second substrate opposed to said first substrate with a gap therebetween;
   an adhesive disposed on at least one side edge of the first substrate and one side edge of the second substrate to fill an opening therebetween; and
   a tape covering said adhesive wherein said tape extends beyond edges of the adhesive to cover portions of the first and second substrates,
   wherein at least one end face of the first substrate and the second substrate has a tapered portion covered by the adhesive layer and the tape.

15. The EL display device according to claim 14 wherein said adhesive comprises a thermosetting resin.

16. The EL display device according to claim 14 further comprising a driver circuit formed over the first substrate for driving said pixel matrix circuit.

17. The EL display device according to claim 14 wherein said tape comprises a metallic material.

18. The EL display device according to claim 14 wherein said adhesive comprises a UV setting resin.

19. A liquid crystal display device comprising:

a first substrate;

a pixel matrix circuit formed over the first substrate;

a second substrate opposed to said first substrate with a gap therebetween;

an adhesive disposed on at least one side edge of the first substrate and one side edge of the second substrate to fill an opening therebetween; and a frame covering said adhesive wherein said frame extends beyond edges of the adhesive to cover portions of the first and second substrates, wherein the adhesive contacts with liquid crystal, and wherein at least one end face of the first substrate and the second substrate has a tapered portion covered by the adhesive layer and the frame.

20. The liquid crystal display device according to claim 19 further comprising a driver circuit formed over the first substrate for driving said pixel matrix circuit.

21. The liquid crystal display device according to claim 19 wherein said tape comprises a metallic material.

22. The liquid crystal display device according to claim 19 wherein said adhesive comprises a UV setting resin.

23. The liquid crystal display device according to claim 19 wherein said adhesive comprises a thermosetting resin.

24. An EL display device comprising:

a first substrate;

a pixel matrix circuit formed over the first substrate;

a second substrate opposed to said first substrate with a gap therebetween;

an adhesive disposed on at least one side edge of the first substrate and one side edge of the second substrate to fill an opening therebetween; and a frame covering said adhesive wherein said frame extends beyond edges of the adhesive to cover portions of the first and second substrates, wherein at least one end face of the first substrate and the second substrate has a tapered portion covered by the adhesive layer and the frame.

25. The EL display device according to claim 24 wherein said adhesive comprises a thermosetting resin.

26. The EL display device according to claim 24 further comprising a driver circuit formed over the first substrate for driving said pixel matrix circuit.

27. The EL display device according to claim 24 wherein said tape comprises a metallic material.

28. The EL display device according to claim 24 wherein said adhesive comprises a UV setting resin.

29. The EL display device according to claim 1 wherein a sealing material is not formed on main surfaces of the first substrate and the second substrate.

30. The EL display device according to claim 5 wherein a sealing material is not formed on main surfaces of the first substrate and the second substrate.

31. The liquid crystal display device according to claim 9 wherein a sealing material is not formed on main surfaces of the first substrate and the second substrate.

32. The EL display device according to claim 14 wherein a sealing material is not formed on main surfaces of the first substrate and the second substrate.

33. The liquid crystal display device according to claim 19 wherein a sealing material is not formed on main surfaces of the first substrate and the second substrate.

34. The EL display device according to claim 24 wherein a sealing material is not formed on main surfaces of the first substrate and the second substrate.

35. A liquid crystal display device comprising:

a first substrate;

a pixel matrix circuit formed over the first substrate;

a second substrate opposed to the first substrate with a gap therebetween;

patterned gap holding members between the first substrate and the second substrate; and an adhesive disposed on at least one side edge of the first substrate and one side edge of the second substrate to fill an opening therebetween, wherein at least one end face of the first substrate and the second substrate has a tapered portion covered by the adhesive.

36. The liquid crystal display device according to claim 35 further comprising a driver circuit formed over the first substrate for driving the pixel matrix circuit.

37. The liquid crystal display device according to claim 35 wherein the adhesive comprises a UV setting resin.

38. The liquid crystal display device according to claim 35 wherein the adhesive comprises a thermosetting resin.

39. The liquid crystal display device according to claim 35 wherein a sealing material is not formed on main surfaces of the first substrate and the second substrate.

40. The liquid crystal display device according to claim 35 wherein diameters of the patterned gap holding members are 1.5 to 2.5 μm.

41. The liquid crystal display device according to claim 35 wherein a density of the patterned gap holding members is 40 to 160 pieces/mm$^2$.

* * * * *